(12) United States Patent
Varel et al.

(10) Patent No.: US 7,025,506 B2
(45) Date of Patent: Apr. 11, 2006

(54) REMOVABLE MORTAR MIXER BEARING AND SEAL ASSEMBLY

(75) Inventors: Edward A. Varel, Rochester, NY (US); William J. Beswick, LeRoy, NY (US)

(73) Assignee: Stone Construction Equipment, Inc., Honeoye, NY (US)

( * ) Notice: Subject to any disclaimer, the term of this patent is extended or adjusted under 35 U.S.C. 154(b) by 646 days.

(21) Appl. No.: 10/076,648

(22) Filed: Feb. 19, 2002

(65) Prior Publication Data

US 2003/0156771 A1 Aug. 21, 2003

(51) Int. Cl.
*F16C 33/78* (2006.01)
*B28C 5/14* (2006.01)

(52) U.S. Cl. .................. 384/477; 384/486; 366/46

(58) Field of Classification Search .......... 364/477, 364/484, 486; 366/45, 279, 331; 277/563
See application file for complete search history.

(56) References Cited

U.S. PATENT DOCUMENTS

| | | | | |
|---|---|---|---|---|
| 1,888,957 A | * | 11/1932 | Longenecker | 277/391 |
| 2,625,446 A | * | 1/1953 | Bjornstad | 277/563 |
| 3,068,051 A | * | 12/1962 | Koch | 384/484 |
| 3,932,006 A | | 1/1976 | Tertinek et al. | |
| 4,097,926 A | * | 6/1978 | Face, Jr. | 366/46 |
| 4,728,198 A | * | 3/1988 | Maekawa et al. | 366/279 |
| 4,850,723 A | * | 7/1989 | Whiteman, Jr. | 384/477 |
| 4,940,342 A | * | 7/1990 | Miyazawa et al. | 384/510 |
| 5,094,540 A | * | 3/1992 | Face, Jr. | 366/46 |
| 5,735,603 A | * | 4/1998 | Kesig et al. | 366/331 |
| 6,435,515 B1 | * | 8/2002 | Galletti | 277/407 |

OTHER PUBLICATIONS

Essick; Mortar Mixers, no date.
Gilson; Mortar Mixers, no date.
Stow; Model 15, 18, 20, 30 and 40 Mortar and Plaster Mixers, no date.
Whiteman; 7- and 9-cu. ft. Plaster/Mortar Mixers, no date.
Crown; Peak Staying Power • Summit of Quality, no date.
Western; Western Mixer Features:, no date.
Anchor; Features Series 600 Mixers, no date.
Mighty; The Difference is in the Design of the Features and Unequalled Quality Control . . . Its built–in, no date.

* cited by examiner

Primary Examiner—Thomas R. Hannon
(74) Attorney, Agent, or Firm—Jacobson Holman PLLC

(57) ABSTRACT

A bearing and seal assembly for supporting and sealing end portions of a rotatable paddle shaft in the end walls of a mortar mixer or the like. Each bearing and seal assembly includes a bearing and seal housing removably attached to an end wall of the mixer drum by bolts to facilitate replacement of the bearings and seals as becomes necessary during use. The outside wall of the housing includes a peripheral ring or shoulder for engagement with a conventional bearing puller to facilitate removal of the housing, bearings and seals as a single unit. Preassembled housing, bearing and seal units can then be used as replacements. The bearings and seals are also spaced longitudinally to provide a space for abrasive materials that may migrate past the seals to extend the life expectancy of the bearings by decreasing exposure to contamination. The housing also includes an opening in the lower portion thereof communicating with the space between the bearings and seals to enable material which migrates past the seals to fall through the opening onto the ground thereby further protecting the bearings from contamination and indicating to the mixer operator that the seals are becoming worn or have failed so that prompt maintenance or replacement may be undertaken.

13 Claims, 2 Drawing Sheets

REMOVABLE MORTAR MIXER BEARING AND SEAL ASSEMBLY

BACKGROUND OF THE INVENTION

1. Field of the Invention

The present invention generally relates to a bearing and seal assembly for supporting and sealing end portions of a rotatable paddle shaft in a mortar mixer or a mixer for similar abrasive materials and the like. More specifically, the bearing and seal assembly of the present invention represents an improvement over the bearing and seal assembly disclosed in U.S. Pat. No. 3,932,006, owned by the assignee of the present application.

2. Description of the Prior Art

U.S. Pat. No. 3,932,006, issued Jan. 13, 1976, discloses a paddle shaft bearing and seal assembly supporting the ends of the pivotal mixer drum and supporting and sealing the paddle shaft ends which extend through openings in the end walls of the mixer drum. The mortar or similar abrasive material being mixed in the drum has a tendency to cause wear and deterioration of the seal assembly with resultant migration of the abrasive material into the interior of the bearing and seal housing and into the bearings thus causing rapid wear of the bearings.

As disclosed in the aforementioned patent, each bearing and seal housing is welded or otherwise permanently attached to the outside surface of the mixer drum end wall. In use of the bearing and seal assemblies disclosed in the above patent, the mixer usually is operated until the seal subassemblies became worn and fail permitting mortar or similar abrasive material to cause wear of the bearings and ultimate seizure of the paddle shaft. In some instances, this seizure requires that the paddle shaft be cut to facilitate removal of the paddle shaft from the drum and subsequent removal of the bearing and seal assemblies to enable replacement. The prior U.S. patents cited in the specification of the above patent and the prior art cited in the "references cited" section of the above patent also disclose various bearing and seal structures for various rotatable components including seals for use in mixers.

Prior commercial mortar mixers with rotating paddle shafts also include some paddle shaft bearing and seal assemblies in which the housings are removable. However, such assemblies do not include a simple and effective bearing and seal assembly which can be easily lubricated or a removable bearing and seal housing which can be readily removed from the end wall of the drum. The prior art also does not utilize a removable bearing and seal housing supporting the bearing and seal subassemblies in a spaced relation with the bottom of the bearing and seal housing in alignment with the space between the bearing and seal subassemblies having a downwardly directed opening. Such an opening allows abrasive material which migrates past the seal subassembly to fall through the opening prior to such material reaching the bearings thereby increasing the life expectancy of the bearings and alerting the operator to seal failure which enables replacement of the bearing and seal assembly prior to the bearings failing due to contamination by the abrasive material migrating past the seal subassembly.

SUMMARY OF THE INVENTION

The paddle shaft seals and supporting bearings for each end of the paddle shaft and the pivotal mixing drum of the present invention are oriented in a bearing and seal housing which is removably attached to the outside surface of the mixer drum end wall by a plurality of removable bolts. This ability to unbolt and remove the bearing and seal housing on both ends of the drum allows the shaft to then be easily removed. In prior art designs where the housings are fixed in place on the outside of the drum, the shaft had to be passed through the bearings. This arrangement proved extremely difficult and often resulted in the shaft having to be cut and replaced, especially in those circumstances where the paddle shaft and bearings seized due to contamination of the bearings by abrasive material migrating past the seal subassembly. In accordance with the present invention, the bearing and seal housing can be removed from the ends of the shaft, thus making shaft removal much easier and replacement of the seals and bearings done much faster. As a result, substantial benefits are achieved in minimizing down time and in time and labor savings. Also, material savings can result by not having to destroy the shaft in the event of seizure.

Further, the removable bearing and seal housing of the present invention includes a pull ring or shoulder formed on the outer cylindrical surface of the housing. The pull ring or shoulder on the outside of the housing allows for standard commercial bearing pullers to be used to remove the entire bearing and seal assembly from the paddle shaft end even in difficult circumstances as when the shaft has seized in the bearing and seal assembly. The pull ring facilitates the easier removal of the housing without unnecessary damage to the housing. Prior art designs required the forced extraction of the bearing from the housing. Such forced extraction often led to damage of the internal surface of the housing. Further, the easier removal of the housing results in further time, labor and material savings.

The removability of the bearing housing enables easier service and replacement of the bearings and seals when they become worn. Also, bearing and seal housings each including new bearing and seal subassemblies can be stocked as a replacement unit to enable quick field replacement by merely unbolting and pulling the bearing and seal housing with the worn bearings and seals and bolting on a replacement bearing and seal housing which includes new bearing and seal subassemblies.

Also, in accordance with the present invention, the bearing and seal subassemblies are oriented in the removable housing in a longitudinally spaced relation. This separation of the seals in relation to the bearings provides a space to receive the mortar or other abrasive material which migrates out of the mixing drum past the seals. The bearing and seal housing also includes a large bottom opening in communication with the space between the seals and bearings so that any material which migrates past the seals will fall downwardly out through the enlarged opening prior to the material contaminating the bearings. The escape of the migrating abrasive material from inside the housing protects the bearings from abrasive material and increases the life expectancy of the bearings.

The provision of the enlarged opening in the bearing and seal housing according to the present invention enables any material that migrates past the seal subassembly to fall through the opening to the ground or other surface area below the bearing and seal assembly. In addition to prolonging the life of the bearing by decreasing exposure to contamination, the material falling through the opening in the bearing and seal housing will serve as a visual indicator to the operator of the mixer that the seals needs replacing. Replacement can be efficiently accomplished by removing the bearing and seal housing from the end wall of the drum by the puller which then enables replacement of the seal subassembly without having shaft failure due to seizure of the bearings and paddle shaft during a mixing job thereby reducing down time and increasing efficiency.

Accordingly, an object of the present invention is to provide a bearing and seal assembly for the paddle shaft of a mortar mixer in which the bearing and seal housing is detachably mounted on each end wall of the mixer drum. Removal of the bearing and seal housings from the end walls of the drum results in substantial reduction in labor and time inasmuch as replacement of the bearing and seal assemblies can be accomplished much faster with substantial savings in repair costs, and the shaft does not have to be destroyed by cutting and removing the seized bearings and shaft which frequently becomes necessary when the mixer is operated until the shaft and bearing seize.

Another object of the present invention is to provide a bearing and seal assembly for the paddle shaft of mortar mixers or the like which enables easy removal of the shaft by providing a bolted, removable bearing and seal housings on each end wall of the mixer drum. By unbolting the bearing and seal housings and sliding the bearing and seal housings and bearing and seal subassemblies off of the shaft, the shaft can be easily removed from the mixer drum.

A further object of the present invention is to provide a mixer shaft bearing and seal assembly in accordance with the preceding objects in which the bearing and seal housing includes an external projecting pull ring or shoulder which enables conventional bearing pullers to be utilized for bearing housing removal thereby providing an efficient and effective procedure for removing the bearing and seal assemblies from the mixer shaft end without damaging the housing.

A still further object of the present invention is to provide a bearing and seal assembly for the paddle shaft of a horizontal drum-type mixer in which extended bearing life is obtained by providing an increased separation of the bearings from the seals which insures that more operation time is permitted before the bearings can become contaminated resulting in longer operation time and productivity.

Still another object of the present invention is to provide a bearing and seal assembly for a paddle shaft in a mortar mixer in which the enlarged space between the bearing and seal subassemblies within a removable bearing and seal housing is aligned with and in communication with an enlarged opening in the lower portion of the housing to enable abrasive material which may migrate from the mixer drum past the seals to fall through the opening in the housing prior to such material reaching and contaminating the bearings.

Yet another object of the present invention is to provide extended bearing life of a bearing and seal assembly in a mortar mixer by including an enlarged vent opening to atmosphere in the lower portion of the bearing and seal housing in alignment with and in communication with an increased space between the bearing and seal subassemblies. The vent opening allows any material which may migrate past the seals to fall downwardly onto the ground surface or other lower surface area not only to prevent contamination of the bearings but also indicate to a mixer operator that the seals have failed in order that prompt maintenance can be initiated to save the bearings and replace the seals.

Additional objects of this invention to be specifically enumerated herein is to provide a mortar mixer bearing and seal assembly in accordance with the preceding objects and which will conform to conventional forms of manufacture, be of simple construction and easy to use so as to provide an assembly that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
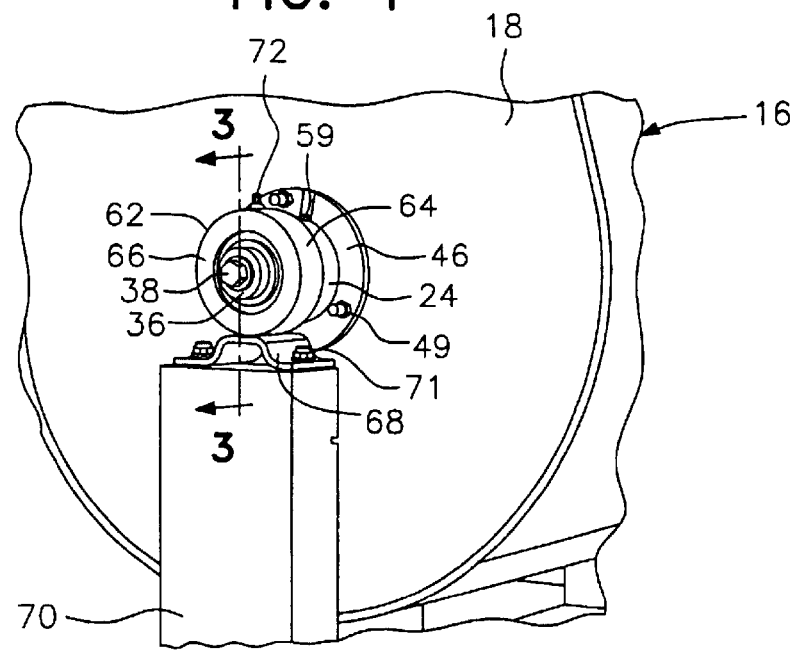
FIG. 1 is a fragmental perspective view of an end portion of a mortar mixer drum, supporting pedestal and trunnion cup and a bearing and seal assembly in accordance with the present invention.
Figure 2:
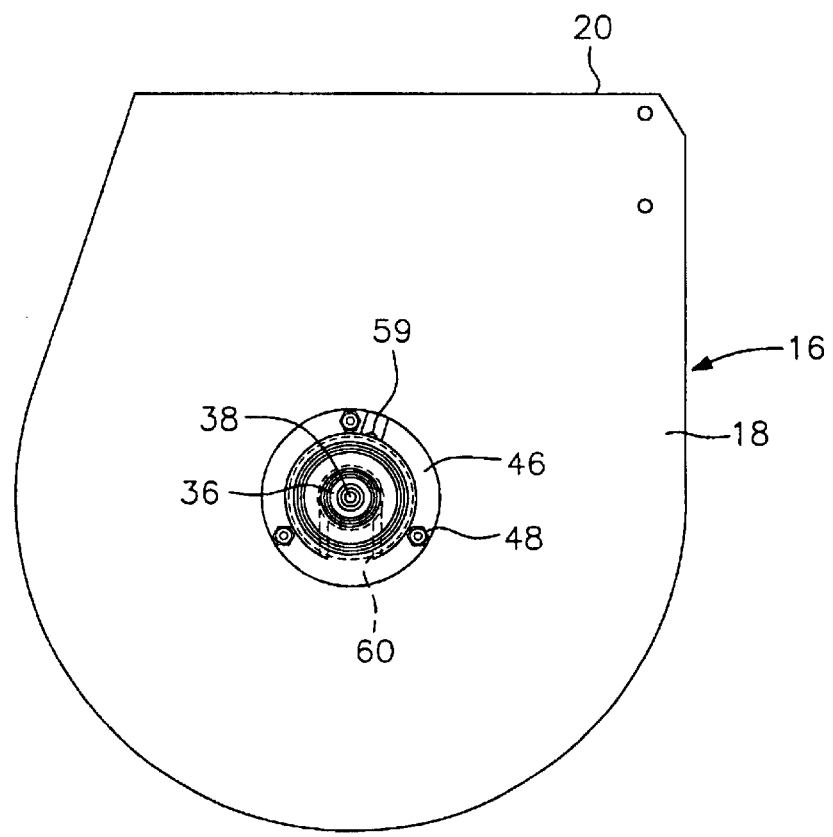
FIG. 2 is an elevational end view of the end of the mixer drum and the bearing and seal assembly of the present invention associated therewith, with the pedestal and trunnion cup removed.

Although only one preferred embodiment of the present invention is explained in detail, it is to be understood that the embodiment is given by way of illustration only. It is not intended that the invention be limited in its scope to the details of construction and arrangement of components set forth in the following description or illustrated in the drawings. Also, in describing the preferred embodiment, specific terminology will be resorted to for the sake of clarity. It is to be understood that each specific term includes all technical equivalents which operate in a similar manner to accomplish a similar purpose.

Referring to the drawings, the bearing and seal assembly of the present invention is generally designated by reference numeral 10. The overall assembly 10 includes a bearing subassembly generally designated by reference numeral 11 and a seal subassembly generally designated by reference numeral 12. The bearing subassembly 11 and seal subassembly 12 support and seal each end of a paddle shaft 14 in a mixer drum 16 having end walls 18. The paddle shaft 14 is rotatably driven and includes paddles (not shown) which mix mortar, plaster or similar abrasive materials. The mixer drum 16 can be pivoted about the axis of the paddle shaft 14 to discharge the mixed contents from the open upper end 20 of the drum 16 in a manner well known in the art.

Each end wall 18 of the drum 16 is provided with an opening 22 through which the paddle shaft 14 extends. The seal subassembly 12 is oriented against the outer surface of the end wall 18 and engages the peripheral surface of the paddle shaft 14 to prevent migration of abrasive material being mixed in the drum 16 along the surface of the paddle shaft 14 through opening 22 toward the bearing subassembly 11.

Figure 3:
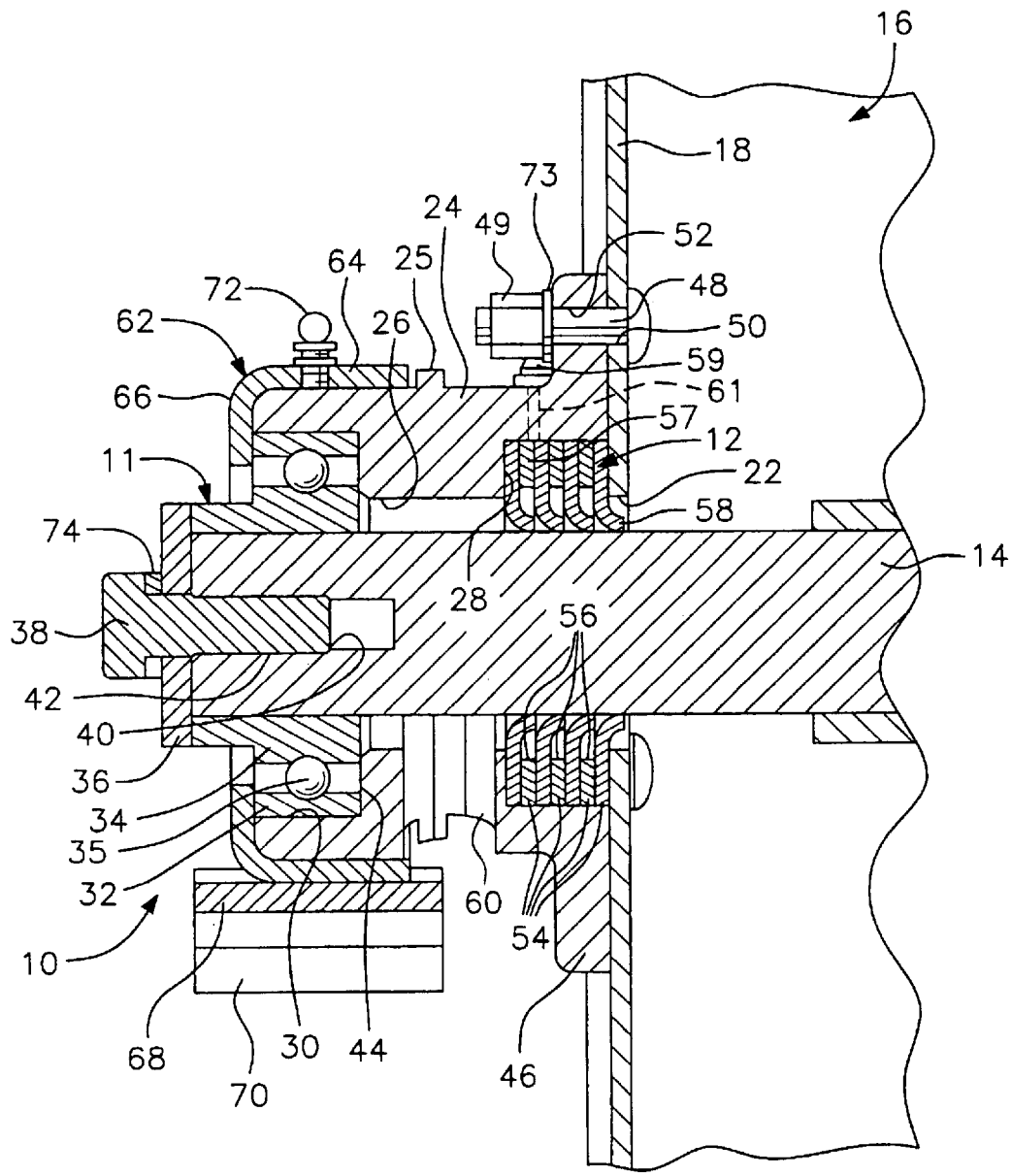
FIG. 3 is a sectional view, on an enlarged scale, taken along section line 3—3 on FIG. 1 illustrating the specific structural details of the bearing and seal assembly of the present invention and its association with the mixer drum and trunnion support.

The bearing subassembly 11 and the seal subassembly 12 are supported in a removable bearing and seal housing 24 of generally cylindrical configuration and provided with a central bore defining a space 26 between the housing 24 and the periphery of the paddle shaft 14. The seal subassembly 12 is mounted in a recess 28 in the end of the housing 24 which faces and engages the end wall 18. The bearing subassembly 11 is supported in a cylindrical recess or bore 30 in the outer end of housing 24. As illustrated in FIG. 3, the bearing recess or bore 30 is spaced from the seal assembly recess 28.

The bearing subassembly 11 is in the form of a sealed ball bearing unit having an outer race 32 engaging the recess 30, an inner race 34 engaged with the periphery of the paddle shaft 14 at an outer end thereof, and a series of ball bearings 35, as well known in the ball bearing art. The sealed ball unit 11 is a unitary subassembly commercially available from ball bearing manufacturers. The inner race 34 of the bearing subassembly 11 is engaged by a retaining washer 36. A retaining bolt 38 extends through washer 36 and is threaded into an internally threaded bore 40 in the shaft 14 as indicated by reference numeral 42. The retaining bolt 38 includes a retaining lock washer 74 with the retaining bolt 38, retaining washer 36 and lock washer securely retaining the bearing subassembly 11 assembled with respect to the paddle shaft 14 and the bearing and seal housing 24 by maintaining the bearing unit 11 against a shoulder 44 forming on the inner end of the recess 30.

The end of the bearing and seal housing 24 which engages the outer surface of the end wall 18 is provided with a peripheral flange 46 which is detachably secured to the end wall 18 by a plurality of bolts 48 which extend through apertures 50 in the end wall 18 and apertures 52 in the flange 46. This structure secures the bearing and seal housing 24 detachably to the end wall 18 of the mixer drum 16. As shown in FIG. 3, the head of bolts 48 are positioned inside the drum wall 18 and are secured outside the flange 46 by outwardly facing nuts 49 and washers 73 to facilitate the easy removal of nuts 49 and washers 73 and disengagement of the flange 46 and housing 24 from the drum wall 18.

The seal subassembly 12 includes a plurality of flexible seals 54 spaced apart by spacers 56. The seals 54 and spacers 56 have their outer edges received in the recess 28 in the housing 24 and completely fill the recess. The inner edges of the seals 54 are curved toward the interior of the drum 16 as indicated at reference numeral 58. The seals 54 are made of suitable flexible resilient material, preferably rubber, plastics such as urethane, or the like, and provide a long lasting and effective seal between the exterior surface of the paddle shaft 14 and the housing 24. The innermost spacer of spacers 56 includes a slot 57 for passage of grease inserted through zerk or lubrication fitting 59 and a passage 61 in the wall of housing 24 and into the seal subassembly 12. By reason of the inward curve of the inner edges of the flexible seals 54, the grease inserted through slot 57 migrates toward the drum 16 and fills up the open spaces between the seals 54 before passing into the drum 16 itself.

The housing 24 includes an elongated arcuate slot-type vent opening 60 in the bottom of the housing which is aligned with and spaced below the enlarged space 26 between bearing subassembly 11 and seal subassembly 12. As such, any abrasive material that migrates from the interior of the drum 16 along the shaft 14 toward the bearings 35 as the seals 54 wear will enter elongated space 26 and fall through the elongated vent opening 60. This arrangement ensures that the abrasive material will not contaminate and cause excessive wear of the bearings 35. The abrasive material dropping though the opening 60 will fall to the ground surface or any other lower surface and provide an indication to the mixer operator that the seals 54 are worn and need replacement.

The bearing and seal housing 24 is supported by a trunnion cup 62 having a cylindrical portion 64 surrounding and journaling the outer end of the housing 24. The trunnion cup 62 includes an inwardly extending flange 66 which engages the end edge of the housing 24 and extends inwardly past the outer race 32 of the bearing 10, as illustrated in FIG. 3. The trunnion cup 62 is supported on a supporting bracket 68 which is rigidly connected to a bottom portion of the cup as by welding or the like. The bracket 68 in turn is attached to the upper end of a pedestal support 70 by bolts 71 to provide a rigid support for the trunnion cup 62. The trunnion cup 62 rotatably supports the outer end of housing 24 in order for the drum 16 to pivot to a position with the open upper end 20 downwardly inclined to dump the contents, such as into a conveyance for transport to a site of use of the mixed material in a manner well known in the art. A zerk or lubrication fitting 72 is provided on the upper portion of the trunnion cup 62 to lubricate the surfaces of the housing 24 and trunnion cup 62 when the housing 24 along with the drum 16 is pivoted between the mixing position and dumping position.

The external surface of the housing 24 is provided with a peripheral ring or shoulder 25 in a middle area thereof which projects outwardly therefrom. The ring or shoulder 25 is preferably continuous around the periphery of the housing 24 except for that area occupied by the arcuate slot opening 60. The ring or shoulder 25 enables a conventional bearing puller to be utilized in removing the bearing subassembly 11 along with the housing 24 and seal subassembly 12 from the paddle shaft 14 after the nuts 49, washers 73, retaining bolt 38, lock washer 74, washer 36, and the support trunnion cup 62 have been removed. The order of removing the nuts 49, retaining bolt 38 and washer 36, and support trunnion cup 62 is not important so long as they are all removed in order to separate the bearing and seal assembly 10 from the shaft 14 by a conventional bearing puller. The puller engages with the rib or shoulder 25 and the end of the shaft 14 to exert axial pressure against the housing 24 and the bearing subassembly 11 to remove these components along with the seal subassembly 12 from the shaft 14.

The foregoing structure of the present invention enables a preassembled cartridge assembly including housing 24, bearing subassembly 11 and seal subassembly 12 to be retained in stock as a unitary assembly so that the entire bearing and seal assembly 10 can be removed and replaced when the quantity of material falling from the vent opening 60 indicates to the mixer operator that the seals 54 have been excessively worn. The structure of bearing and seal assembly 10 also enables replacement of the bearing and seal subassemblies 11 and 12 in an efficient and effective manner and eliminates seizing of the paddle shaft with respect to the bearings 35 when the bearings becomes contaminated with abrasive material. This structure further enables the mixer to continue in operation until the operator of the mixer is informed regarding the condition of the seals 54 by observing material falling downwardly from the vent opening 60. This positive indicator of seal wear enables an increase in operating time and productivity and materially reduces the down time of a mixer in view of the short time necessary to replace worn seals by removing the housing 24 together with bearing and seal subassemblies 11 and 12 and then replacing these components with a new preassembled bearing and seal assembly.

The foregoing is considered as illustrative only of the principles of the invention. Further, numerous modifications and changes will readily occur to those skilled in the art. For example, the pull ring or shoulder 25 need not be in the form of a pull ring, but could be in the form of spaced projections, or even notches in the side of the housing such as to receive and engage the ends of a conventional bearing puller to move the housing 24 and the bearing and seal subassemblies 11 and 12 laterally with respect to the shaft 14. As such, it is not desired to limit the invention to the exact construction and operation shown and described, and, accordingly, all suitable modifications and equivalents may be resorted to, falling within the scope of the invention.

What is claimed as new is as follows:

1. A seal and bearing assembly for receiving and supporting one end portion of a driven rotary shaft, which comprises a housing adapted for removable attachment to an end wall of a receptacle through which the driven shaft passes, bearing and seal subassemblies laterally spaced in said housing and forming a unitary assembly surrounding said shaft and supporting the shaft from the housing adjacent an end extremity of the shaft, a trunnion member surrounding and journaling said housing from a support, said housing having an elongated, arcuate slot type vent opening in a bottom portion thereof, said opening being in general alignment with and in communication with a space between the bearing and seal subassemblies to enable material which passes through the seal assembly from the receptacle to fall through said opening.

2. The structure as defined in claim 1, wherein said receptacle is a mortar mixer drum rotatable about the axis of the shaft for dumping, said shaft being a paddle shaft and extending through an aperture in an end wall of the drum, said housing being bolted to said end wall to enable removal and replacement of the unitary assembly of the housing, seal subassembly and bearing subassembly with a preassembled unitary assembly of a housing, bearing subassembly and seal assembly.

3. The structure as defined in claim 2, wherein said shaft includes a retaining member removably mounted on an end thereof remote from said end wall of said drum for engaging a bearing of said bearing subassembly, said bearing being a ball bearing having an inner race engaged by the retaining member and an outer race seated against a shoulder in said housing, said housing and trunnion member having cylindrical bearing surfaces enabling rotatable movement of the housing and drum independent of rotation of the paddle shaft.

4. The structure as defined in claim 3, wherein said housing includes a peripheral outwardly extending shoulder thereon to enable a bearing puller to engage the peripheral shoulder and the end of the shaft to pull the unitary assembly of said housing, seal subassembly and bearing subassembly off the shaft and drum end wall.

5. A replacement seal and bearing assembly for receiving and supporting one end of a paddle shaft extending through an aperture in an end wall of a drum of a mortar mixer which comprises a housing, fasteners removably mounting said housing on said drum end wall, bearing and seal subassemblies laterally spaced in said housing and surrounding said shaft and supporting said shaft from the housing adjacent an end extremity of the shaft, and a trunnion member surrounding and journaling said housing from a support, and said housing and said bearing and seal subassemblies being combined into a unitary assembly for removal and replacement of said unitary assembly with a preassembled unitary assembly.

6. The structure as defined in claim 5, wherein said housing includes a peripheral wall surrounding and supportingly engaging said bearing subassembly and said seal subassembly to form said unitary assembly, and a peripheral flange engaging an end wall of the mixer drum, said bolt fasteners detachably securing said flange to the end wall of the mixer drum to enable removal of said unitary assembly of the housing, the bearing and seal subassemblies from the end wall of the mixer drum and replacement with a preassembled unitary assembly including a housing, bearing subassembly and seal subassembly.

7. The structure as defined in claim 5, wherein said peripheral wall of said housing includes a peripheral outwardly extending shoulder intermediate the ends of the housing for engagement by a conventional bearing puller to enable axial force to be exerted on said unitary assembly to separate the unitary assembly from the shaft.

8. In a mortar mixer, a pivotally supported generally horizontally disposed mixer drum, a rotatably driven paddle shaft extending through drum end walls, an outwardly projecting housing on each end wall rotatably supporting remote ends of said paddle shaft, laterally spaced bearings and seals interposed between the housing and shaft and forming a unitary assembly for rotatably supporting the shaft and forming a seal between the shaft and the housing, said housing including an elongated, arcuate slot type vent opening in a bottom portion thereof communicating with a space between the bearings and seals to discharge material migrating between the shaft and seals to protect the bearings from contamination by material being mixed in the drum and indicating wear conditions of the seals.

9. The structure as defined in claim 8, wherein said housing includes a peripheral flange supported from an end wall of the mixer drum, and fastening means detachably securing said flange on the end wall of the mixer drum to enable removal of said unitary assembly of said housing, bearings and seals from the end wall of the mixer drum thereby enabling replacement of the unitary assembly with a preassembled unitary assembly of a housing, seals and bearings.

10. The structure as defined in claim 9, wherein said bearings are mounted in a bearing subassembly on said shaft, an internal shoulder in said housing engaging said bearing subassembly, said housing including a peripheral outwardly projecting rib intermediate the ends thereof to enable a bearing puller to exert an axial force on said housing and bearing subassembly to separate said bearing subassembly from said shaft.

11. The structure as defined in claim 10, wherein said shaft includes a retaining member removably mounted on the end thereof remote from the end wall for engaging the bearing subassembly, said bearing assembly having an inner race engaged by the retaining member and an outer race seated against said shoulder in said housing and ball bearings therebetween.

12. The structure as defined in claim 8, wherein each of said housings is pivotally supported from a supporting trunnion to enable the drum to pivot about the axis of the paddle shaft from a mixing position to a dumping position, said trunnions retaining said housings axially on supports, said housing and trunnions having cylindrical bearing surfaces enabling rotatable movement of the housings and drum independent of rotation of the paddle shaft.

13. In a mortar mixer, a pivotally supported generally horizontally disposed mixer drum, a rotatably driven paddle shaft extending through drum end walls, an outwardly projecting housing rotatably supporting an end of said paddle shaft from a drum end wall, laterally spaced bearings and seals interposed between the housing and shaft for rotatably supporting the shaft and forming a seal between the shaft and the housing, said housing including an opening in a bottom portion thereof communicating with a space between the bearings and seals to discharge material migrating between the shaft and seals to protect the bearings from contamination by the material being mixed and indicating wear conditions of the seals, said housing including a peripheral flange supported from an end wall of the mixer drum, and fasteners detachably securing said flange on the end wall of the mixer drum to enable removal of said housing, bearings and seals from the end wall of the mixer drum thereby enabling replacement with a preassembled housing, bearings and seals, said bearings being mounted in a bearing subassembly on said shaft, an internal peripheral shoulder on said housing peripherally engaging said bearing subassembly, said housing including a peripheral outwardly projecting rib intermediate the ends of said housing to enable a bearing puller to exert an axial force on said housing, said internal shoulder on said housing including a peripheral axial surface engaging a peripheral axial surface on said bearing subassembly to separate said bearing subassembly from said shaft by exerting axial force peripherally on said bearing subassembly.

* * * * *